United States Patent
Krumbacher et al.

(10) Patent No.: US 9,346,175 B2
(45) Date of Patent: May 24, 2016

(54) INDUSTRIAL ROBOT WITH A RING-SHAPED TRAILING STOP

(71) Applicant: KUKA Roboter GmbH, Augsburg (DE)

(72) Inventors: Rainer Krumbacher, Rettenbach (DE); Franz Liebl, Aichach (DE); Christoph Groll, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 699 days.

(21) Appl. No.: 13/860,251

(22) Filed: Apr. 10, 2013

(65) Prior Publication Data

US 2013/0305866 A1 Nov. 21, 2013

(30) Foreign Application Priority Data

May 21, 2012 (DE) .......................... 10 2012 208 430

(51) Int. Cl.
*H01H 25/06* (2006.01)
*B25J 18/06* (2006.01)
*B25J 9/10* (2006.01)

(52) U.S. Cl.
CPC *B25J 18/06* (2013.01); *B25J 9/101* (2013.01); *Y10S 901/28* (2013.01); *Y10T 74/20317* (2015.01)

(58) Field of Classification Search
CPC .......... B25J 17/00; B25J 17/02; B25J 17/241; B25J 17/25; B25J 9/101
USPC ........ 74/490.01, 490.05, 490.06, 813 R, 814, 74/815, 816, 813 C; 901/27, 28, 29; 403/348, 349
See application file for complete search history.

(56) References Cited

U.S. PATENT DOCUMENTS

| 3,469,494 A * | 9/1969 | Frailly ................. F16B 21/183 411/517 |
| 5,193,658 A | 3/1993 | Tellden |
| 2003/0060319 A1 * | 3/2003 | Zeise ....................... F16H 48/10 475/220 |
| 2006/0224275 A1 * | 10/2006 | Heldesjo ................. B25J 9/101 700/245 |
| 2010/0092123 A1 * | 4/2010 | Stolzle ......................... 384/548 |
| 2011/0072918 A1 * | 3/2011 | Reekers ................... B25J 9/101 74/55 |
| 2011/0104988 A1 * | 5/2011 | Wenninger ............... B24B 9/10 451/5 |

FOREIGN PATENT DOCUMENTS

| DE | 42 03 663 A1 | 8/1992 |
| DE | 296 16 401 U1 | 10/1997 |
| DE | 10 2009 043 404 A1 | 9/2011 |

OTHER PUBLICATIONS

German Patent Office; Search Report in German Patent Application No. 10 2012 208 430.4 dated Jul. 24, 2013; 5 pages.

* cited by examiner

*Primary Examiner* — William Kelleher
*Assistant Examiner* — Joseph Brown
(74) *Attorney, Agent, or Firm* — Wood, Heron & Evans, LLP

(57) ABSTRACT

An industrial robot includes a robot arm having multiple connecting links connected by joints, wherein at least two adjacent connecting links are connected by a swivel joint and can be adjusted by a motor. A mechanical stop device defines a maximum rotatable adjustment angle between the adjacent links and includes a stop projection connected to one of the two adjacent connecting links, an engaging piece connected to the other one of the two adjacent connecting links, and a trailing stop which can be adjusted by the engaging piece. The trailing stop comprises a trailing stop body and an annular body which is connected with the trailing stop body and which is pivoted in an annular groove in an inner wall of a housing component of one of the two adjacent connecting links.

16 Claims, 2 Drawing Sheets

INDUSTRIAL ROBOT WITH A RING-SHAPED TRAILING STOP

TECHNICAL FIELD

The invention relates to an industrial robot which comprises a robot arm having multiple connecting links that are connected by means of joints, in which at least two adjacent connecting links, respectively, are connected by means of a joint, which is designed as a swivel joint, can be adjusted by means of a motor and is defined in its maximum rotatable adjustment angle by means of a mechanical stop device.

BACKGROUND

Industrial robots are machines which can be equipped for automatically handling and/or processing objects with tools, and which can be programmed by means of their joints in multiple axes of motion, for example, with regard to orientation, position and workflow. Industrial robots usually have a multi-axis robot arm, which can be automatically and manually adjusted especially by electric motors, and a programmable controller (control device), which controls or regulates the movements of the industrial robot during the operation.

Robot arms essentially comprise a frame and a carousel which is pivoted about a rotation axis in relation to the frame. Mounted to said carousel is a rocker arm which, in turn, is mounted to a robot arm boom with a robot hand, in which the robot arm boom and/or the robot hand can have multiple joints. Depending on the constructive design of the robot arm, the potential rotary motions of one or multiple joints or robot axes can be mechanically defined by fixed stops to less than 360°, or can be defined by fixed stops to more than 360°, for example, to between 380° and 420°.

To allow the carousel to rotate more than 360° in relation to the frame, the DE 296 16 401 U1 discloses an industrial robot which comprises a frame having a partially annular connecting link arranged concentric to the rotation axis which connecting link has a slidably mounted trailing stop. The carousel comprises an engaging piece which interacts in one rotational direction of the carousel with one side of the trailing stop when reaching the connecting link, and in the opposite direction interacts with the opposite side, and which always carries the trailing stop up to the stop at the opposite side of the connecting link. The trailing stop can be provided on all sides, or merely on the sides affected by impact and friction with a dampening coat, for example, in the form of vulcanized rubber. To avoid that the trailing stop is tilted but is smoothly guided across the sliding surface, the trailing stop requires a specific width.

The DE 10 2009 043 404 A1 discloses an industrial robot which has a multi-axial robot arm with a frame, a carousel pivoted about an axis in relation to the frame, and a mechanical stop device provided for defining a rotary motion of the carousel in relation to the frame. Said stop device comprises a connecting link arranged at the frame, which connecting link has stops on its ends, a trailing stop arranged in the connecting link, and an engaging piece arranged at the carousel, wherein the engaging piece and the connecting link are designed in such a way that the engaging piece is inserted in the connecting link when the horizontal rotating table is rotating about the axis and is pushing the trailing stop against the relevant stop. The trailing stop comprises a plastically malleable damping element which is provided to decelerate the horizontal rotating table by means of the engaging piece when because of plastic deformation the trailing stop pushes the relevant stop.

SUMMARY

The invention has the objective of improving the industrial robot with a mechanical stop device. In particular, the invention has the objective of providing an industrial robot with an improved mechanical trailing stop device which fits completely into a housing component and which is designed in a particularly space-saving manner.

The problem of the invention is solved through an industrial robot which comprises a robot arm having multiple connecting links which are connected by means of joints, in which at least two adjacent connecting links, respectively, are connected by means of a joint, which is designed as a swivel joint, can be adjusted by means of a motor and is defined in its maximum rotatable adjustment angle by means of a mechanical stop device. Said connecting links comprise a stop device which is connected to one of the two adjacent connecting links, an engaging piece which is connected to the other of the two adjacent connecting links and a trailing stop which can be adjusted by one of the engaging pieces. Said trailing stop comprises a trailing stop body and an annular body that is connected with the trailing stop body which is pivoted at least partially or completely in an annular groove in an inner wall of a housing component of one of the two adjacent connecting links.

The industrial robot comprises a robot arm and a programmable controller (control device), which controls or regulates the movements of the industrial robot during the operation in that one or multiple automatically or manually adjustable joints (robot axes) are moved in particular by electric motors in which the controller controls or regulates the motors.

The maximum rotatable adjustment angle of an exemplary swivel joint can be defined in that in the respective end angle positions the engaging piece drives the adjustable trailing stop against the stop device and mechanically pushes in such a way that the respective motor receives at least a significant current increase and, as a result of the current increase, the controller stops the motor so that the respective joint comes to a halt in a controlled or regulated manner. However, in particular cases, an invention-based stop device can also be designed in such a way that the mechanical strike in itself causes the respective joint to come to a halt, independent of the extent to which the respective motor is controlled or regulated by the controller.

The invention-based stop device can form an override protection, especially at the arm boom axis, for example, the fourth of six robot axes having a rotatable adjustment angle, for example, of between plus 185° and minus 185°. For example, said override protection can ensure the maintenance of the maximum rotatable adjustment angle during manual movement, i.e., during a manually controlled electromotive operation of the joints, especially during an adjustment of the industrial robot.

With the invention-based stop device, it is possible to implement such an override protection in a minimal installation space. It is also possible to incorporate in said installation space a sensor, especially an adjustment sensor. In particular embodiments, it is not necessary to achieve the robustness of a completely mechanically operated trailing stop required in case of failure. However, it is possible to provide a more solid construction so that this model can also be designed as trailing stop.

According to the invention, the trailing stop, i.e., the override protection, is designed as an annular body which is inserted at least partially or completely in an annular groove in an inner wall of a housing component of one of the two adjacent connecting links. The annular body can be installed similar to a retaining ring (DIN 472) in a groove in the cast iron part and is thus located in the interior of the robot arm. As a result, no further components are required for the installation of the override protection, and the interference contour is not changed or impaired.

The trailing stop or override protection can have an eccentric internal or external contour, which is designed in such a way that during assembly the annular body maintains its annular external contour in order to guarantee perfect assembly. Furthermore, a lug at the annular body can be provided with a keyhole-shaped opening in order to generate a spring effect when moving into the stop position To define the axial angle, i.e., to define the maximum rotatable adjustment angle, it is possible to set cylinder pins. In this way, it is possible to extend the override protection up to between approximately plus 320° and minus 320°. When designed as a limit stop, it is possible to provide additional buffer elements. For example, when the axial angle ranges between approximately plus 200° and minus 200°, it is also possible to implement an adjustment sensor on the same level on which the annular body is located. As a result, it is possible to minimize the axial length of the respective housing component.

The invention-based annular body is pivoted in the interior of the housing component. As a result, the annular body is fixed axially in the housing component and rotatably guided in peripheral direction. In this respect, the annular body forms a swivel device by means of which the trailing stop is pivoted. As a result, the trailing stop or trailing stop body is connected with the annular body.

The annular body can be formed by a spring-loaded open circular arc which has two opposite ends and which is designed to have its external diameter minimized in that the ends of the circular arc are moving resiliently toward one another in such a way that the annular body can be inserted in and/or removed from the annular groove of the housing component, and to be axially fixed in the annular groove of the housing component and pivoted in peripheral direction when the annular body resiliently reaches at least partially or completely a relaxed condition.

By means of the annular body, the trailing stop, in particular the trailing stop body, can be rotatably assembled in a simple manner in the interior of the housing component. Moreover, because of the particularly flat and small design in the form of a ring, only a small space is required in the interior of the housing component to implement the trailing stop device. For example, the annular body can be produced from a sheet metal part consisting of spring steel punched out of semi-finished steel plate. Alternatively, the annular body can be also laser cut from a semi-finished steel plate.

By forming a spring-loaded open circular arc which has two opposite ends, the annular body can be designed in analogous manner as a retaining ring, especially as a type of retaining ring according to DIN 472, and can be assembled as such for installation purposes generally known to experts. Furthermore, such an annular body can be designed to be extremely flat in axial extension so that only a very small space is required for implementing the trailing stop device inside the housing component.

Each of the two ends of the circular arc can comprise a projection or an eye which is designed to accept, respectively, a manual tip of a gripping device designed in such a way that the ends of the circular arc are moving toward one another. Such a projection or such an eye can be designed in analogous manner for a projection or an eye such as is known to an expert from retaining rings, especially a type of retaining ring according to DIN 472.

The trailing stop body can be formed by a flap extending radially inward from an annular body, especially by a flap produced in one piece with the annular body. At the same time, the trailing stop body comprises two opposite stop surfaces which, depending on the stop position, line up, respectively, at one of two counter stop surfaces of the stop device in the respective maximum rotation angle position of the joint.

The flap can comprise two crosspieces extending radially from one another which define a recess formed in the flap. The defined angular range of the trailing stop results from an adjustment of the width of the flap or the distance of the crosspieces from one another at the trailing stop body or the override protection and the angle between, for example, two screws, bolts or pins of the stop device. The recess provides the flap or the two crosspieces with a particular resilience by means of which the impact is dampened when the trailing stop body and the stop device are coming in contact.

Each crosspiece can comprise a base portion of the crosspiece which is minimized in the cross section compared to a radially protruding portion of the crosspiece, which base portion is designed to resiliently attach the radially protruding crosspiece portion to the annular body. By providing each crosspiece with a base portion of the crosspiece which is minimized in the cross section compared to a radially protruding portion of the crosspiece, the dampening properties can be additionally enhanced beyond the recess.

Generally, the stop projection can be formed by two projections, particularly screws, bolts or pins, arranged at an angle and especially at the same radial distance from the rotation center of the joint. Between said projections, the trailing stop body can be rotated in its mounting position inserted in the annular groove of the housing component about the angle, particularly an angle of between 40 and 80 degrees, especially 60 degrees. Consequently, the two projections, particularly screws, bolts or pins, define the pivoting angle about which the trailing stop, in particular the trailing stop body, is pivoted in the groove of the housing component. It is possible to provide two or multiple receptacles, particularly bore holes or threaded bore holes, in the housing component, wherein a projection, bolt or pin can be detachably inserted in each receptacle or bore hole or threaded bore hole. In the process, it is possible to change the angle range in which the trailing stop, in particular the trailing stop body, is rotating when one or multiple projections, screws, bolts or pins are removed or unscrewed. It is also possible, for example, to provide only two projections, screws, bolts or pins, which can be selectively inserted in or removed from two of multiple receptacles, particularly bore holes or threaded bore holes, which are evenly distributed across the periphery, in order to change the angle range according to the desired maximum rotatable adjustment angle.

In the housing component of one of the two adjacent connecting links, a receiving hole for an adjustment sensor protruding radially into the interior of the housing component can be inserted, and the annular body of the trailing stop can be inserted in the annular groove of the housing component in such a way that in each rotary position of the trailing stop, particularly the annular body, the receiving hole or adjustment sensor is positioned in the section of the annular body that is open toward the circular arc and that is located between the two ends of the circular arc. The receiving hole for an adjustment sensor protruding radially into the interior of the housing component can be placed where the inner wall of the housing component just is not used by the annular body, that is, in each accessible rotary position of the annular body defined by the stop device. In such an embodiment, this type of opening of the limit stop is used to expose the adjustment sensor, particularly the adjustment cartridge, which protrudes into the housing. Said adjustment cartridge is adapted to the movement of the override protection between the screws to ensure that the adjustment cartridge is not damaged during operation.

In all embodiments, the engaging piece can be formed by a projection, particularly a screw, bolt or pin, which, depending on the rotational direction of the other one of the two adjacent connecting links, can strike at one side of the adjustable trailing stop, particularly at a crosspiece or at the other side of the adjustable trailing stop, especially at the other crosspiece to rotate the trailing stop in the annular groove of the housing component. When the respective connecting link is rotating, the engaging piece first rotates freely on a circular path about the rotation axis of the connecting link until the engaging piece lines up at the trailing stop or the trailing stop body, and pushes the trailing stop body about the angle range within which the trailing stop, especially the trailing stop body, is rotating, until the trailing stop attaches to the stop device when the maximum rotating adjustment angle of the joint is reached.

In all embodiments, the trailing stop, particularly the annular body, can be designed in the form of a retaining ring, particularly in the form of a retaining ring according to DIN 472. In such an embodiment, the trailing stop, i.e., the override protection, can be assembled in a joint of the robot arm. The override protection can be designed in the form of a retaining ring and can be inserted in the groove of the housing component by means of retaining ring mounting pliers.

BRIEF DESCRIPTION OF FIGURES

In the attached diagram an embodiment of the invention is depicted in an exemplary manner. It is shown.

DETAILED DESCRIPTION

Figure 1:
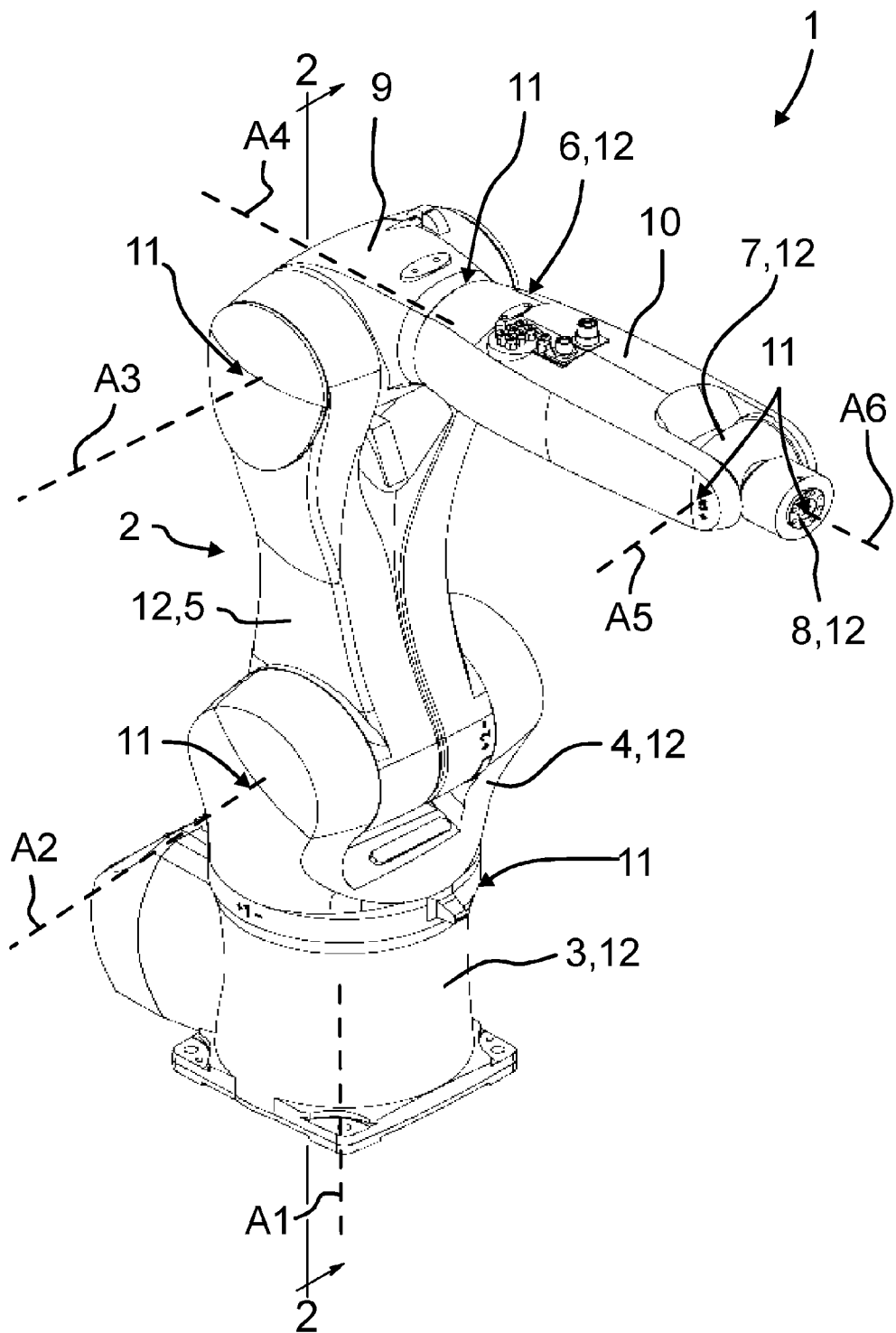
FIG. 1 a perspective view of an industrial robot having an invention-based trailing stop, and FIG. 2 an axial top view on an opened housing component with inserted annular body, a stop device and an engaging piece.

FIG. 1 shows an industrial robot 1 comprising a robot arm 2. In the present embodiment, the robot arm 2 comprises multiple connecting links 12 arranged one after the other and connected by means of joints 11. In particular, the connecting links 12 involve a frame 3 and a carousel 4 which is pivoted about a vertical rotation axis A1 in relation to the frame. In the present embodiment, further connecting links of the robot arm 2 involve a rocker arm 5, a robot arm boom 6 and preferably a robot hand 7 which has a mounting device designed as a flange 8 for attaching an end effector (not shown). For example, the lower end of the rocker arm 5 is swivel-mounted preferably about a horizontal rotation axis A2 at a bearing head (not shown) on the carousel 4. At the upper end of the rocker arm 5, the robot arm boom 6 is swivel-mounted preferably also about a horizontal axis A3. One end of the robot arm boom 6 comprises the robot hand 7 with its preferably three rotation axes A4, A5, A6.

In the case of the present embodiment, the robot arm boom 6 comprises a first housing component 9 that is swivel-mounted at the rocker arm 5. At the first housing component 9 of a first connecting link 12, a second housing component 10 of a second connecting link 12 of the robot arm boom is pivoted about the axis A4.

Figure 2:
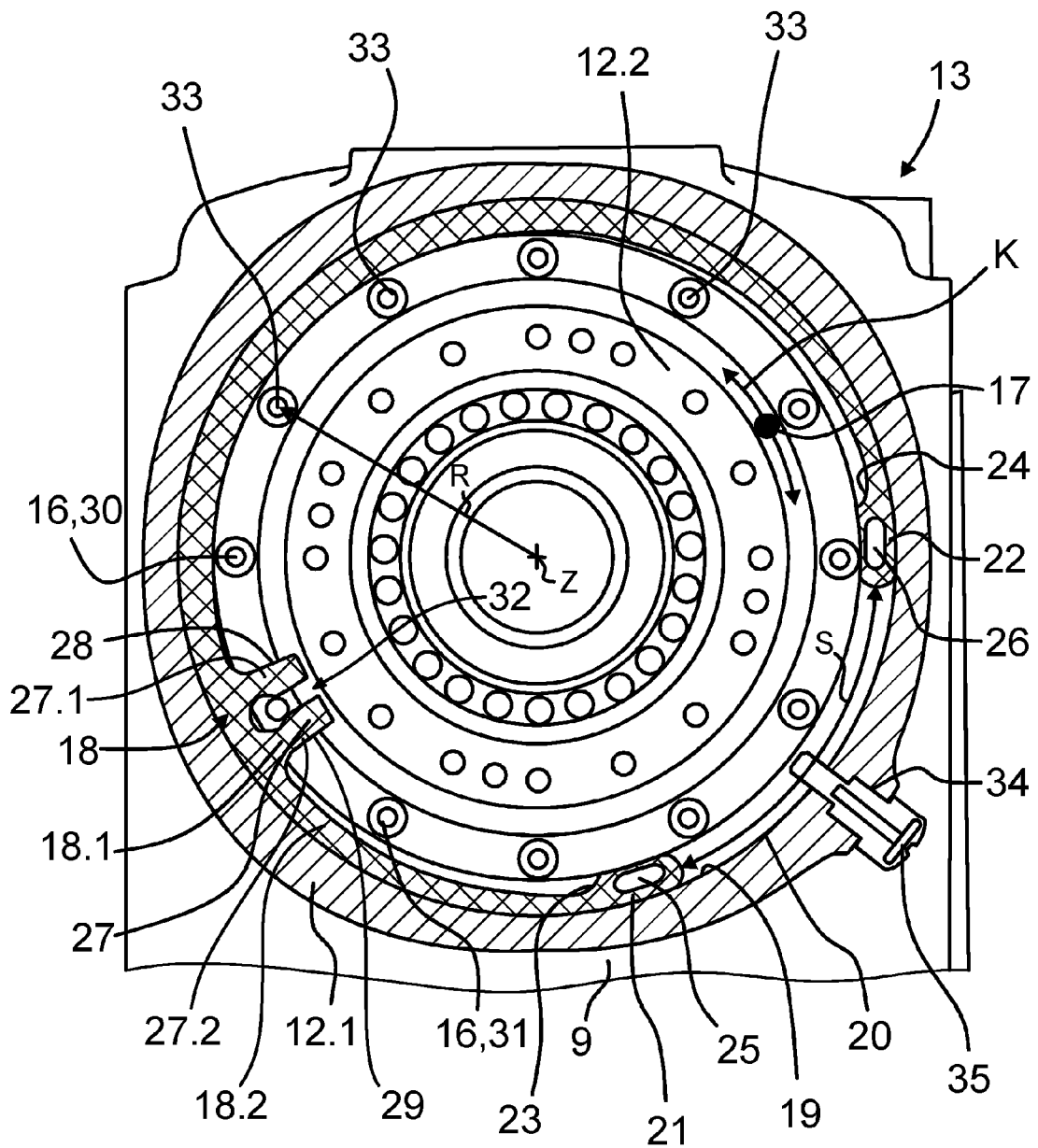

The maximum rotatable adjustment angle is defined by a mechanical stop device 13. FIG. 2 shows a cross-section view of the mechanical stop device 13. The stop device 13 comprises a stop projection 16 which is connected with one connecting link 12.1 of the two adjacent connecting links 12.1, 12.2; an engaging piece 17 which is connected with the other connecting link 12.2 of the two adjacent connecting links 12.1, 12.2; and a trailing stop 18 which can be adjusted by means of the engaging piece 17. Said trailing stop 18 comprises a trailing stop body 18.1 and an annular body 18.2 which is connected with the trailing stop body 18.1. Said annular body 18.2 is at least partially or completely inserted in an annular groove 19 in an inner wall 20 of a housing component 9, 10 of one connecting link 12.1 of the two adjacent connecting links 12.1, 12.2.

In the case of the present embodiment, the annular body 18.2 is formed by a spring-loaded open circular arc which has two opposite ends 21, 22 and which is designed to have its external diameter minimized in that the ends 21, 22 of the circular arc resiliently move toward one another in such a way that the annular body 18.2 can be inserted in and/or removed from the annular groove 19 of the housing component 9, 10 and is axially fixed in the annular groove 19 of the housing component 9, 10 resiliently in an at least partially or completely relaxed condition and pivoted in peripheral direction.

Each of the two ends 21, 22 of the circular arc comprise a projection 23, 24 or an eye 25, 26 which is designed to accept, respectively, a manual tip of a gripping device designed in such a way that the ends 21, 22 of the circular arc are moving toward one another.

The trailing stop body 18.1 is formed by a lug 27 extending radially inward from an annular body 18.2, especially by a lug 27 produced in one piece with the annular body 18.2. At the same time, the trailing stop body 18.2 comprises two opposite stop surfaces 28, 29 which, depending on the stop position, line up, respectively, at one of two counter stop surfaces of the stop projections 16 in the respective maximum rotation angle position of the joint 11. The defined angular range of the trailing stop 18 results from an adjustment of the width of the lug 27 or the distance of the crosspieces 27.1 and 27.2 from one another at the trailing stop body 18.1 and the angle between two projections 30, 31, for example, two screws, bolts or pins of the stop projection 16.

In the embodiment shown, the lug 27 is formed by two crosspieces 27.1, 27.2 extending radially from one another which define a recess 32 formed in the lug 27.

Each crosspiece 27.1, 27.2 comprises a base portion of the crosspiece 27.1, 27.2 which is minimized in the cross section compared to a radially protruding portion of the crosspiece 27.1, 27.2, which base portion is designed to resiliently attach the radially protruding crosspiece portion to the annular body 18.2.

In the embodiment shown in FIG. 2, the stop projection 16 is formed by two projections 30, 31, particularly screws, bolts or pins, arranged at an angle and especially at the same radial distance R from the rotation center Z of the joint 11. Between said projections 30, 31, the trailing stop body 18.1 is rotated in its mounting position inserted in the annular groove 19 of the housing component 9, 10 about the angle, particularly an angle of between 40 and 80 degrees, especially 60 degrees. It is possible to provide two or multiple receptacles 33, particularly bore holes or threaded bore holes, in the housing component 9, 10, wherein a projection 30, 31, bolt or pin can be detachably inserted in each receptacle 33 or bore hole or threaded bore hole.

In the process, it is possible to change the angle range in which the trailing stop 18, in particular the trailing stop body 18.1, is rotating when one or multiple projections 30, 31, bolts or pins are removed or unscrewed. It is also possible, for example, to provide only two projections 30, 31, bolts or pins, which can be selectively inserted in or removed from two of multiple receptacles 33, particularly bore holes or threaded bore holes, which are evenly distributed across the periphery, in order to change the angle range according to the desired maximum rotatable adjustment angle.

In the embodiment, in the housing component 9, 10 of one of the two adjacent connecting links 12, a receiving hole 34 for an adjustment sensor 35 protruding radially into the interior of the housing component 9, 10 has been inserted, and the annular body 18.2 of the trailing stop 18 is inserted in the annular groove 19 of the housing component 9, 10 in such a way that in each rotary position of the trailing stop 18, particularly the annular body 18.2, the receiving hole 34 or adjustment sensor 35 is positioned in the section S of the annular body 18.2 that is open toward the circular arc and that is located between the two ends 21, 22 of the circular arc. The receiving hole 34 for the adjustment sensor 35 protruding radially into the interior of the housing component 9, 10 can be placed where the inner wall 20 of the housing component 9, 10 just is not used by the annular body 18.2, that is, in each accessible rotary position of the annular body 18.2 defined by the stop device 13. In such an embodiment, this type of opening of the limit stop is used to expose the adjustment sensor 35, particularly the adjustment cartridge, which protrudes into the housing component 9, 10. Said adjustment cartridge is adapted to the movement of the override protection between the screws to ensure that the adjustment sensor 35 is not damaged during operation.

In the embodiment shown, the engaging piece 17 is formed by a projection, particularly a screw, bolt or pin, which, depending on the rotational direction of the other one of the two adjacent connecting links 12, can strike at one side of the adjustable trailing stop 18, particularly at one of the crosspieces 27.1 or at the other side of the adjustable trailing stop 18, especially at the other crosspiece 27.2 to rotate the trailing stop 18 in the annular groove 19 of the housing component 9, 10.

When the respective connecting link 12 is rotating, the engaging piece 17 first rotates freely on a circular path K about the rotation axis of the connecting link 12 until the engaging piece 17 lines up at the trailing stop 18 or the trailing stop body 18.1 or one of the stop surfaces 28, 29, and pushes the trailing stop body 18.1 about the angle range within which the trailing stop 18, especially the trailing stop body 18.1, is rotating, until the trailing stop 18, i.e., one of the crosspieces 27.1, 27.2 attaches to the stop projection 16 or one of the projections 30, 31 when the maximum rotating adjustment angle of the joint 11 is reached.

What is claimed is:

1. An industrial robot, comprising:
a robot arm having multiple connecting links that are connected by joints, wherein at least two adjacent connecting links are connected by a swivel joint and are movably adjusted by a motor; and
a mechanical stop device defining a maximum rotational adjustment angle between the two adjacent connecting links, the mechanical stop device comprising:
a stop projection connected to one of the two adjacent connecting links;
an engaging piece connected to the other one of the two adjacent connecting links,
a trailing stop which can be adjusted by the engaging piece, the trailing stop comprising a trailing stop body and an annular body connected with the trailing stop body, the trailing stop body pivoting within an annular groove in an inner wall of a housing component of one of the two adjacent connecting links,
wherein the stop projection is defined by two projections angularly spaced apart about an axis of rotation of the swivel joint, between which projections the trailing stop body rotates within the annular groove of the housing component, and
a plurality of receptacles in the connecting link to which the stop projection is connected, each of the plurality of receptacles configured to receive one of the two projections of the stop projection, whereby the maximum rotational adjustment angle is varied by selective insertion of the two projections in respective ones of the plurality of receptacles.

2. Industrial robot according to claim 1, wherein the annular body is formed by a spring-loaded open circular arc which comprises two opposite ends, the circular arc having an external diameter that is minimized when the ends of the circular arc are resiliently moved toward one another, whereby the annular body can be inserted in and/or removed from the annular groove of the housing component, and whereby the annular body is axially fixed in the annular groove of the housing component for pivotal movement in peripheral direction when the annular body resiliently reaches at least partially or completely a relaxed condition.

3. Industrial robot according to claim 2, wherein each of the two ends of the circular arc comprises a projection or an eye configured to accept, respectively, a manual tip of a gripping device that is configured to move the ends of the circular arc toward one another.

4. Industrial robot according to claim 1, in which the trailing stop body is formed by a lug extending radially inward from an annular body.

5. Industrial robot according to claim 4, wherein the lug comprises two, spaced apart, radially extending crosspieces which define a recess formed in the lug.

6. Industrial robot according to claim 5, wherein each crosspiece comprises a base portion which is narrowed in the cross section compared to a radially protruding portion of the crosspiece, which base portion resiliently attaches the radially protruding crosspiece portion to the annular body.

7. Industrial robot according to claim 2, further comprising:
a receiving hole in the housing component of one of the two adjacent connecting links; and
an adjustment sensor received in the receiving hole and protruding radially into the interior of the housing component;
the annular body of the trailing stop disposed within the annular groove of the housing component in such a way that in each rotary position of the trailing stop, the receiving hole or adjustment sensor is positioned in a section of the annular body that is open toward the circular arc and located between the two ends of the circular arc.

8. Industrial robot according to claim 1, wherein the engaging piece is formed by a projection which, depending on the rotational direction of the other one of the two adjacent connecting links, strikes one side of the adjustable trailing stop to rotate the trailing stop in the annular groove of the housing component.

9. Industrial robot according to claim 1, wherein the trailing stop is designed as a type of retaining ring.

10. Industrial robot according to claim 4, wherein the lug is formed as one piece with the annular body.

11. Industrial robot according to claim 1, wherein:
   the stop projection comprises screws, bolts, or pins; and/or
   the two projections comprising the stop projection are arranged at the same radial distance from the rotation center of the joint.

12. Industrial robot according to claim 1, wherein the two projections comprising the stop projection are angularly spaced apart between 40 degrees and 80 degrees.

13. Industrial robot according to claim 7, wherein the receiving hole or adjustment sensor is positioned in the section of the annular body that is open toward the circular arc in each rotary position of the annular body of the trailing stop.

14. Industrial robot according to claim 8, wherein the engaging piece is comprises a screw, bolt, or pin.

15. Industrial robot according to claim 8, wherein:
   the trailing stop body comprises two, spaced apart, radially extending crosspieces; and
   the engaging piece strikes one of the crosspieces to rotate the trailing stop in the annular groove.

16. Industrial robot according to claim 9, wherein the trailing stop is designed according to DIN 472.

* * * * *